United States Patent
Goldman et al.

(10) Patent No.: US 9,305,329 B2
(45) Date of Patent: Apr. 5, 2016

(54) LOW MEMORY CONTENT AWARE FILL

(71) Applicant: Adobe Systems Incorporated, San Jose, CA (US)

(72) Inventors: Dan Goldman, Seattle, WA (US); Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 75 days.

(21) Appl. No.: 14/339,161

(22) Filed: Jul. 23, 2014

(65) Prior Publication Data

US 2014/0333644 A1 Nov. 13, 2014

Related U.S. Application Data

(63) Continuation of application No. 13/652,548, filed on Oct. 16, 2012, now Pat. No. 8,818,135.

(60) Provisional application No. 61/602,011, filed on Feb. 22, 2012.

(51) Int. Cl.
*G06K 9/32* (2006.01)
*G06T 1/60* (2006.01)
*G06T 5/00* (2006.01)

(52) U.S. Cl.
CPC . *G06T 1/60* (2013.01); *G06T 5/005* (2013.01); *G06T 2207/20021* (2013.01); *G06T 2207/20172* (2013.01)

(58) Field of Classification Search
CPC . G06T 2207/20021; G06T 1/60; G06T 5/005; G06T 2207/20172
USPC ........ 348/208.13, E9.042; 382/173, 254, 299
See application file for complete search history.

(56) References Cited

U.S. PATENT DOCUMENTS

| | | | |
|---|---|---|---|
| 8,014,596 B2* | 9/2011 | Campbell et al. | 382/164 |
| 2009/0003702 A1* | 1/2009 | Ofek et al. | 382/181 |
| 2010/0296748 A1* | 11/2010 | Shechtman et al. | 382/254 |
| 2013/0089258 A1* | 4/2013 | Herling et al. | 382/173 |

FOREIGN PATENT DOCUMENTS

IL 2008139465 11/2008

OTHER PUBLICATIONS

Korman, et al., Coherency Sensitive Hashing, Dept. of Electrical Engineering Tel Aviv University, 2011.
Wexler, et al., Space-Time Completion of Video, IEEE Transactions on Pattern Analysis and Machine Intelligence, vol. 29, No. 3, Mar. 2007, 14 pages.
Notice of Allowance in related U.S. Appl. No. 11/652,548, dated May 25, 2014, 13 pages.

* cited by examiner

*Primary Examiner* — Gregory F Cunningham
(74) *Attorney, Agent, or Firm* — Kilpatrick Townsend & Stockton LLP

(57) ABSTRACT

A first image at a first resolution is received, the first image having a first hole therein. Based on the first image, a second image is generated at a second resolution lower than the first resolution, the second image having a second hole therein corresponding to the first hole. In the second image, one or more second-image source patches for the second hole are identified. At least one first-image source patch in the first image is identified based on a location of the identified second-image source patch. The identified at least one first-image source patch are stored in memory. Fill content are identified in the at least one first-image source patch stored in the memory. The identified fill content are placed in the first hole.

20 Claims, 5 Drawing Sheets

LOW MEMORY CONTENT AWARE FILL

CROSS-REFERENCE TO RELATED APPLICATION

This application is a continuation application of U.S. patent application Ser. No. 13/652,548 filed on Oct. 16, 2012, allowed, which claims priority to U.S. Provisional Application No. 61/602,011, filed Feb. 22, 2012, the contents of all are incorporated herein by reference in their entireties.

BACKGROUND

This specification relates to digital image processing.

Some existing image processing techniques use patch-based techniques for manipulating content. The processing can involve analyzing or synthesizing patches (e.g., pixel groups) of image content. For example, patch-based approaches are used in denoising image and video content; enhancing image resolution such as performing super-resolution; compressing image content; changing image aspect ratio such as by retargeting; reshuffling of image content; stitching images together; editing image content; and performing texture synthesis. Patch-based methods can have benefits for synthesis operations. For example, structure, texture, repetitive patterns and redundancies can be treated.

Techniques have been tried for completing images in different ways, and they can rely on patch-based techniques. For example, hole-filling techniques exist that attempt to find content for a hole in an image by analyzing content elsewhere in the image. Cloning techniques exist where a user manually can select a source region which is then cloned to a target region to fill the hole.

SUMMARY

This specification describes technologies relating to image modification using an image at two or more resolutions.

In one aspect, a method is performed by data processing apparatus. The method includes receiving a first image at a first resolution, the first image having a first bole therein. The method further includes generating, based on the first image, a second image at a second resolution lower than the first resolution, the second image having a second hole therein corresponding to the first hole. The method further includes identifying, in the second image, one or more second-image source patches for the second hole. The method further includes identifying at least one first-image source patch in the first image based on a location of the identified second-image source patch. The method further includes storing the identified at least one first-image source patch in memory. The method further includes identifying fill content in the at least one first-image source patch stored in the memory. The method further includes placing the identified fill content in the first hole.

Implementations can include any, all, or none of the following features. The first hole includes a plurality of tiles; and wherein i) the identification of the at least one first-image source patch in the first image; ii) the storing of the identified at least one first-image source patch; and iii) the placement of the identified fill content are performed for each first-hole tile. One or more portions of some of the first-hole tiles overlap with one or more portions of other first-hole tiles, the method further including feathering at least one of the portions of first-hole tiles that overlap. The method including determining that the first image cannot be stored in memory; and creating the second image by progressively reducing the resolution of the first image until the second image can be stored in memory. Identifying the first-image source patch includes generating a map of the first-image source patches, the map indicating a count of the times each source patch is identified; generating, for each entry in the map of the first-image of source patches, a summation value that aggregates that entry and neighboring entries; and identifying a highest summation value. Generating the summation value includes convolving the map of the first-image source patches. The fill content is identified using image content bordering that part of the hole as a constraint.

In one aspect, a computer storage medium is encoded with a computer program. The program includes instructions that when executed by data processing apparatus cause the data processing apparatus to perform operations including receiving a first image at a first resolution, the first image having a first hole therein. The operations further include generating, based on the first image, a second image at a second resolution lower than the first resolution, the second image having a second hole therein corresponding to the first hole. The operations further include identifying, in the second image, one or more second-image source patches for the second hole. The operations further include identifying at least one first-image source patch in the first image based on a location of the identified second-image source patch. The operations-further include storing the identified at least one first-image source patch in memory. Tire operations further include identifying fill content in the at least one first-image source patch stored in the memory. The operations further include placing the identified fill content in the first hole.

Implementations can include any, all, or none of the following features. The first hole includes a plurality of tiles; and wherein i) identifying at least one first-image source patch in the first image based or a location of the identified second-image source patch; ii) storing the identified at least one first-image source patch in memory; and iii) placing the identified fill content in the first hole is repeated for each first-hole tiles. Some portions of some of the first-hole tiles overlap with some portions of other first-hole tiles, the method further including feathering the portions of first-hole tiles that overlap. The operations further include determining that the first image cannot be stored in memory; and creating the second image by progressively reducing the resolution of the first image until the second image can be stored in memory. Identifying the first-image source patch includes generating a map of the first-image source patches, the map indicating a count of the times each source patch is identified; generating, for each entry in the map of the first-image of source patches, a summation value that aggregates that entry and neighboring entries; and identifying a highest summation value. Generating the summation value includes convolving the map of the first-image source patches. The fill content is identified using image content bordering the hole as a constraint.

In one aspect, a system includes a user device. The system further includes one or more computers operable to interact with the device and to perform operations including receiving a first image at a first resolution, the first image having a first hole therein. The operations further include generating, based on the first image, a second image at a second resolution lower than the first resolution, the second image having a second hole therein corresponding to the first hole. The operations farther include identifying, in the second image, one or more second-image source patches for the second hole. The operations further include identifying at least one first-image source patch in the first image based on a location of the identified second-image source patch. The operations further include storing the identified at least one first-image source patch in memory. The operations further include identifying fill content in the at least one first-image source patch stored in the memory. The operations further include placing the identified fill content in the first hole.

Implementations can include any, all, or none of the following features. The one or more computers include a server operable to interact with the device through a data communication network, and the device is operable to interact with the server as a client. The device includes a personal computer running a web browser, a mobile telephone running a web browser, a tablet computer running a web browser. The one or more computers consist of one computer, the device is a user interface device, and the one computer includes the user interface device.

Particular embodiments of the subject matter described in this specification can be implemented so as to realize one or snore of the following advantages. Hole filling in images based on the content of the image can be improved. The content can be searched for from any part of the image without loading the full image in a memory buffer. A hole filling process can trade some amount of processing time for reduced memory requirements and higher quality results. Hole filling processes can be provided that are well suited do memory limited computing environments, such as mobile phones and tablet computers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a low resolution content aware fill can be performed on an image, for example as a step in a process to fill a hole in the image. The low resolution image can fit in a memory buffer, wherein the entire original image may be too large to fit in the memory buffer at once. Based on the results of the low resolution fill, one or more portions of the original image can be loaded into the memory buffer for use as source content in filling the hole at the original resolution. As such, in some examples, the search for content can cover the entire global image without the entire image being loaded into memory at once.

Figure 1:
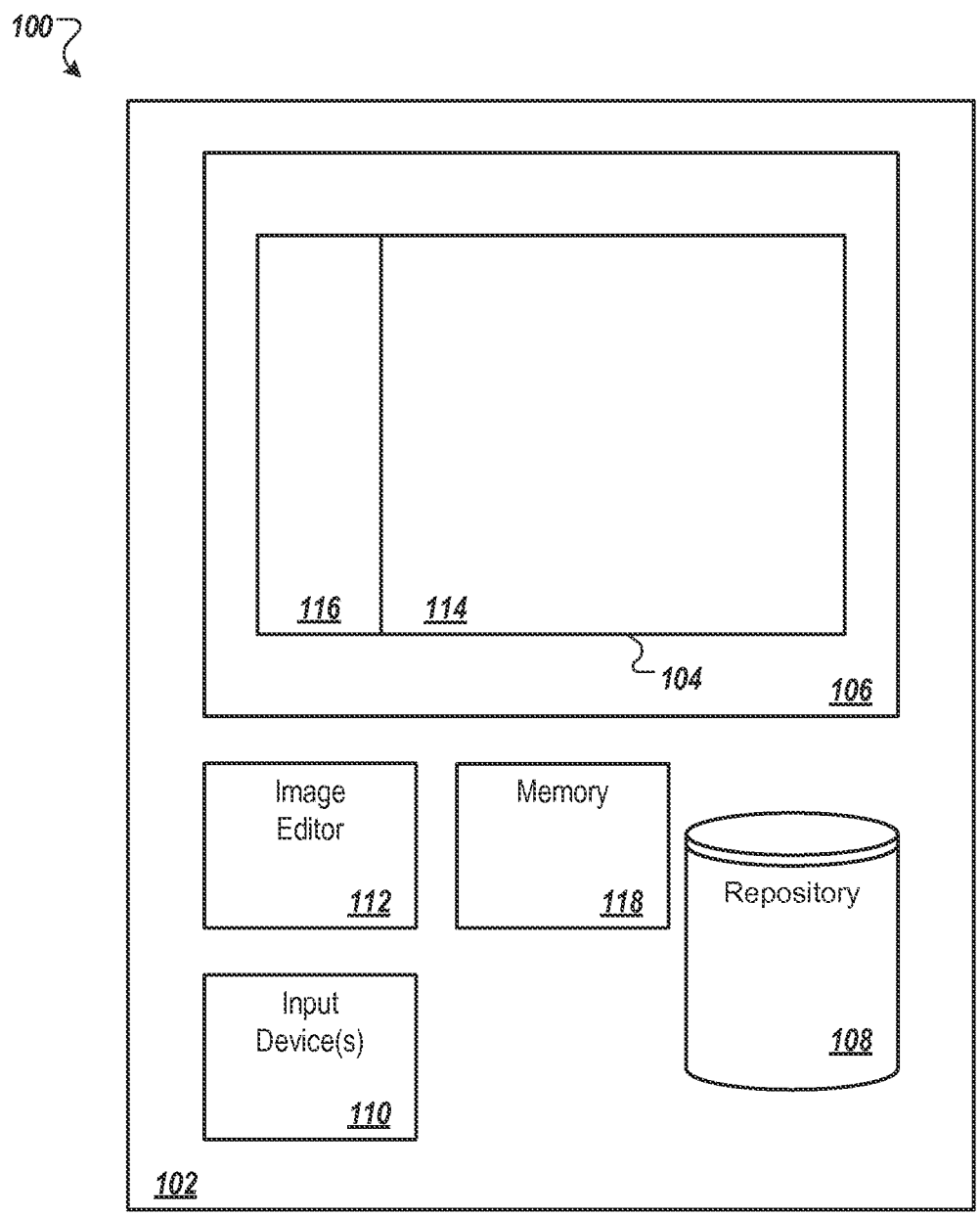
FIG. 1 shows an example system that can generate a modified image.

FIG. 1 shows an example system 100 that can generate an updated image. The system 100 includes a computer device 102, which can be any processor-based device including, but not limited to, a personal computer, a server device, a workstation or a handheld device, to name just a few examples.

The system 100 includes a graphical user interface (GUI) 104 that here is generated by the computer device 102. For example, the GUI 104 can be displayed on a display device 106 connected to or integrated in the computer device. The GUI 104 is for example used in the manipulation of images, such as to show a user an initial image and/or an updated image.

The system 100 includes at least one repository 108, which can be implemented using any technology suitable for storing data, such as in form of a memory, a hard drive, or an optical disk, to name a few examples. The repository 108 can contain one or more images, for example images that have not been modified and/or updated images. The system 100 can make one or more images in the repository 108 available to a user, for example by displaying the image(s) in the GUI 104.

The system 100 includes at least one input device 110, such as a keyboard, mouse, pointing device, trackball, joystick, track pad, touchscreens or any other device with which a user can control and/or respond to the computer device 102, to name a few examples. The user can make one or more inputs to affect image processing, such as to identify or create holes in images to be filled, or perform other graphics operations.

The system 100 can be used for any of a number of purposes, such as for modifying an image by performing hole-filling in an image, which will be described as an illustrative example below. Other applications include, but are not limited to, modifying a photograph to add image content to the photograph, for example in one or more holes in the photograph.

Generally, the modification involves adding information in an area of the initial image, the additional information having been the added information having been selected from one or more other areas of the image. Here, these and other operations are performed by an image editor component 112 that can be implemented using processor-executed instructions stored in a computer readable storage device, such as in a memory or on a disk. The image editor component 112 can generate output for display in the GUI 104, such as an image display area 114 and an input control area 116. In some implementations, the image editor component 112 can also perform one or more other image editing functions, such as compositing, wrapping, and/or animation.

The system 100 includes at least one memory 118, which can be implemented using any technology suitable for storing data that is in use, such as in form of Random Access Memory (RAM) or Dynamic Random Access Memory (DRAM). The memory 118 can store executing applications and related data, such as the image editor 112 and one or more images being used by the image editor 112.

In some implementations, content filling (e.g., by the system) can be performed in a two stage process. In a first stage, content filling is done at a lower resolution using patch-based optimization. In a second stage, results of the low-resolution fill can be used in one or more ways to facilitate or enhance content filling that is done at a higher (e.g., normal) resolution using a technique of memory management that involves image tiles.

In some cases patch-based optimization in context of filling holes can involve matching each patch inside the hole with at least one patch outside the hole, the outside patch being the one that best fits the one or more criteria that apply to filling the patch inside the hole. However, other types of patch-based hole filling techniques are known and may be used.

Nearest-neighbor techniques can foe used in hole-filling algorithms. For example, a nearest-neighbor process can be applied to any patch in an initial image (e.g., to a predetermined number of pixels such as a 5×5 or 7×7 pixel patch). A nearest-neighbor field can be determined that maps each patch coordinate in the initial image to a two-dimensional offset space. The offset represents the adjustment in patch coordinates between the patch in the initial image and the corresponding patch in the modified image. For example, an initial patch a in the initial image has a nearest-neighbor patch b in the modified image. The nearest-neighbor field f is then defined as $$f(a)=b-a$$

The offset values of the nearest-neighbor field can be stored in an array. For example, the array can have the same dimensions as the initial image.

In some implementations, the patch-based optimization begins with an initial set of Offsets. Next, an iterative update Based on the initial offsets is applied to the nearest-neighbor field. In each iteration, good patch offsets are propagated to neighboring patches, and a random search is performed in the neighborhood of the best offset.

The initial offsets can be generated by randomly assigning values to the offset field, or by using prior information. In some implementation, an earlier low-resolution hole-filling iteration provides image content that can be used as initial offsets.

In the iterative process, patch offsets can be examined in scan order throughout the offset array. Each iteration can include a propagation step and a random-search step. In the propagation step, the process evaluates whether one or more nearby mappings can improve the mapping for the current patch. For example, if the mapping for the adjacent patch is a better mapping than what has so far been found for the current patch, then the process will attempt to use that mapping for the current patch. In some iterations, such as in every other iteration, the offsets can be examined in reverse order so that information about offset/mapping quality is propagated in an opposite direction.

Mappings can be evaluated using a patch distance function. Any distance function, can be used. Some implementations can use common distance functions for natural images and/or other data sources including video and three-dimensional shapes, such as an $L_p$, $L_1$, or clamped $L_2$, etc., or any other scalar function. In some implementations, the patch distance function is selected such that the optimal offsets for neighboring overlapping patches have a high probability of being similar. The higher this probability, the faster the algorithm converges.

In a random-search step, the process attempts to improve a mapping by randomly searching within the image for a better mapping (i.e., for a target patch whose distance metric to the source patch is lower). In some implementations, patches at successively decreasing distance from the target patch can be evaluated. For example, a uniform random selection of direction chosen in the field $[-1,1]\times[-1,1]$ is selected, and an exponential function is used to decrease the distance from a maximum pixel radius. If a better mapping is found in the random search, it is substituted for the current mapping.

The iterations are halted when a criterion is met. In some implementations, the criterion is whether the fraction of modified offsets falls below a threshold. In some implementations, a fixed number of iterations is used, for example five.

As noted above, patch-based optimization can be performed in both low- and high-resolution stages. For example, the modified image can be a version of the initial image where an image hole has been filled. That is, the initial image can first be modified when its resolution is reduced and low-resolution hole-filling is performed, and thereafter also modified when its resolution is increased (e.g., to foil, resolution) and high-resolution hole-filling is performed. The entire process is repeated iteratively to compute a high quality final solution.

A nearest-neighbor algorithm can be performed iteratively in an inner loop of a bidirectional or unidirectional similarity algorithm. In some implementations, a bidirectional similarity measure is used that finds good correspondences between image regions in both directions (e.g., from a patch in the initial image to a patch in the modified image, and vice versa). For example, in a coherence steps the algorithm seeks a nearest-neighbor patch outside the hole for every patch inside the hole. In a completeness step/the algorithm seeks a nearest-neighbor patch inside the hole for every patch outside the hole. These searches generate nearest-neighbor votes in both directions between the source and target images. The votes are used to compote the color of each pixel inside the bole (for example, by averaging or clustering) in each inner loop iteration.

Once the process is finished, or as it is executing, a map of patches can be created. This map, referred to here as a source map, can be used to document a count of the number of times a patch, in the initial image is found by the nearest-neighbor algorithm and used to fill a hole or otherwise modify the image. The source map has entries that correspond to each patch in the initial image. The entries can be initialized with, for example, a zero value or NULL to start. Each time that a patch is used, the corresponding entry is incremented. As such, a patch that is used, for example, three times will have a corresponding value in the source map of three.

Figure 2:
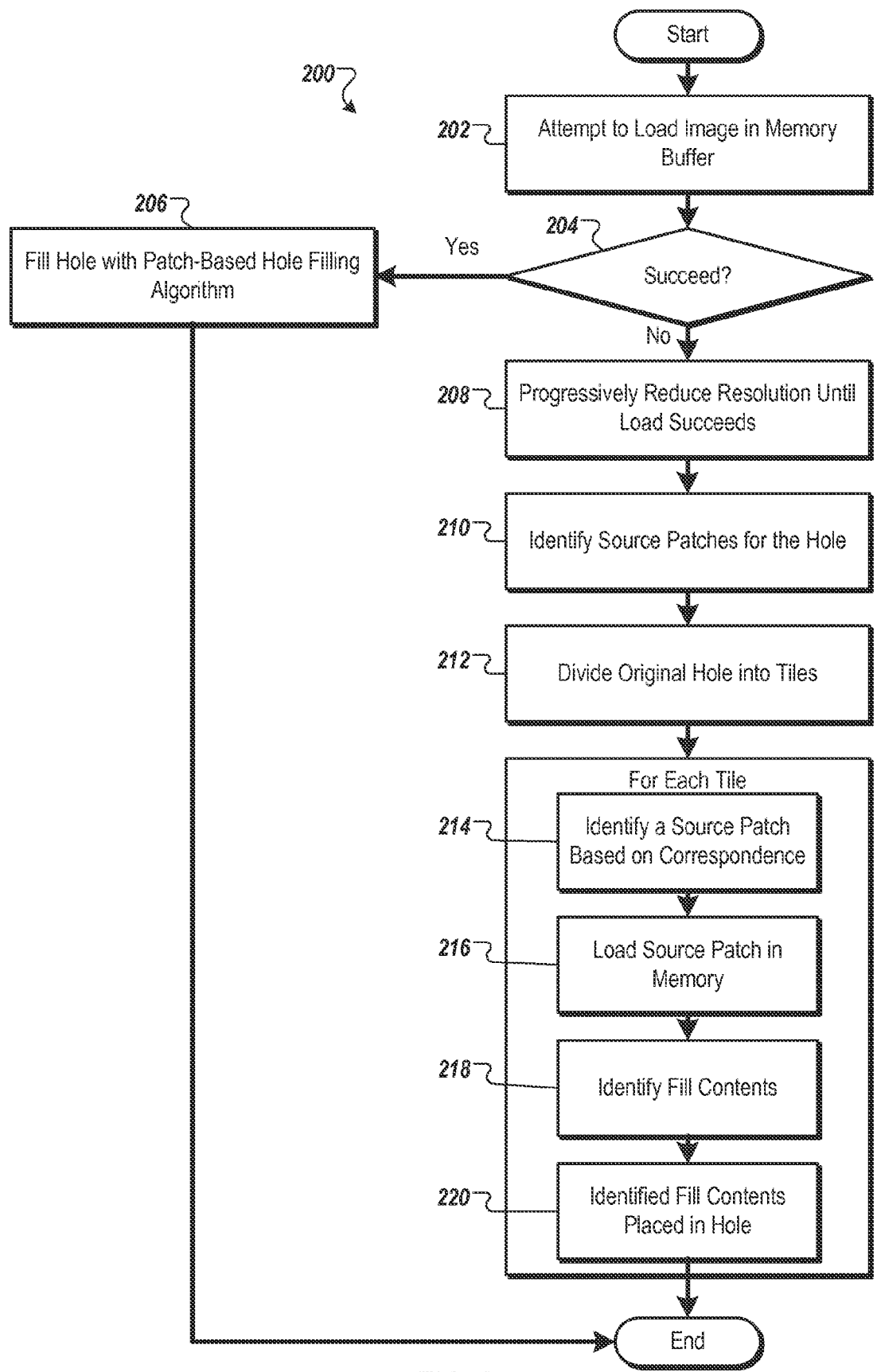
FIG. 2 shows a flowchart for an example process of filling a hole in an image.

FIG. 2 shows a flowchart for an example process 200 of filling a hole in an image. In some implementations, the process 200 can be performed by a system such as the system 100 (FIG. 1). As such, an example of the process 200 will be described as being performed by the system 100. However, other systems, or groups of systems, can perform the process 200. For example, the process 200 can be split across a client and server.

An image is attempted to be loaded into a memory buffer (202). For example, a user of the image editor 112 can, through the input device 110, edit an image to delete a section of the image, creating a hole in the image. The user can then prompt the image editor 112 to fill the hole with content from the image. To find this content, the image editor 112 can allocate a memory buffer in the memory 118 and attempt to load the image into the memory for purpose of the hole-filling.

In some implementations, the image editor 112 may allocate the largest memory buffer possible. The memory requirements of a given content aware fill vary based on the algorithms used, but in many cases memory is needed for input, output, and several other temporary buffers for intermediate computations. Those buffers can include, but are not limited to nearest-neighbor fields, various masks, mipmaps, and accumulation buffers. As such, the memory requirements of some content aware fill and similar algorithms may be several times the size of input and output buffers, and the memory buffer allocated here may be used for any of these buffers.

In some configurations, the size of the memory buffer may be limited by the computer device 102. For example, the image editor 112 may be executing in a sandbox that has a memory footprint managed by the computer device 102. Alternatively, the image editor 112 may have an internal limit on the size of the memory buffer it creates. For example, some operating systems may manage memory by killing or halting any process that uses too much memory. Here, limiting the size of the memory buffer may prevent the operating system from killing one or more processes of the image editor 112.

If the image can be successfully loaded into the memory buffer (204), the hole is filled with a patch-based hole filling algorithm (206). For example, the image editor 112 can fill the hole of the image with a nearest-neighbor based patch-based optimization algorithm, or any other appropriate type of content aware fill.

If the image cannot be loaded into the memory buffer (204), the resolution of the image can be progressively reduced until the load can succeed (208). For example, the image editor 112 can create a copy of the image and reduce the size of the copy image to fit within the memory buffer. In some implementations, the image editor 112 can progressively reduce the resolution of the copy by some reduction ratio until the copy image is successfully loaded into the memory buffer. Possible values for the redaction ratio include, but are not limbed to, 95:100, 9:10, 7:8 and 1:2.

Loading the reduced-resolution copy image into the memory buffer allows the image editor 112 to access any portion, of the copy image, albeit at a lower resolution. As such, the image editor 112 can, for example, search for content in any part of the copy image without loading and unloading portions of the image from memory 112.

One or more source patches are identified for the hole (210). In some implementations, a patch-based hole filling algorithm is performed to identify patch correspondences. For example, the image editor 112 can fill the hole of the copy image with a nearest-neighbor patch-based optimization algorithm, or any other type of content aware fill using the copy image. As such, image editor 112 can modify the original image so that the hole is filled with low resolution content from the copy image. Alternatively, the image editor 112 can execute the patch-based hole filling algorithm without the step of adding the low-resolution content to the hole of the original image.

The original hole is divided into files (212). For example, the image editor may partition the original image into a collection of axis aligned dies that each overlaps neighboring tiles. The image editor 112 may select a file size that matches the size of the memory buffer, or is a fraction thereof, so the memory buffer can be hilly loaded with tiles without leftover space. The image editor 112 can, if it filled the hole in the copy image, upconvert the resolution of the content filled into the hole of the copy image. The image editor 112 can then fill the hole in the original image with this upconverted content. This initial hole fill content can be used as an initial guess of the contents to be filled into the hole in the original image.

While processing the patch-based hole filling algorithm, the image editor 112 can create a collection of source maps. In some implementations, this is done after the low-resolution fill and before a high-resolution fill. For example, the source maps can correspond exactly to the tiles, and can be computed during the tile-splitting process, one-by-one, to minimize memory usage. The most recently computed nearest-neighbor field can be used in creating the source maps. Each source map is associated with some region of the hole of the image in the output buffer. The source maps indicate a count of, for one region of the hole, the areas of the copy image that have been used to fill that region of the hole. Each source map may be used to identify so area of the copy image from which higher resolution content may be found for use in filling. For example, a summation can be found for each entry in the maps with the highest summation value showing the location from which high resolution content may be found. One process for creating this summation can include adding the values of surrounding entries to entry. Another process can include convolving, or blurring, the map.

In some implementations, images may be stored in the repository 108 in a tiled file Layout. In such cases, the tiles into which the hole is divided (212) need not have any particular relationship to this tiled file layout and can be independent thereof.

For each tile at least one source patch in the first image is identified based on a location of the patch correspondences (214), the identified at least one source patch is stored in memory (216), fill content in the at least one source patch stored in the memory is identified (218), and the identified lid content is placed in the hole (220). For example, an area of most source patches is identified, a search area is loaded into the memory buffer, a patch-based hole filling algorithm is performed to identify content, and the hole is filled with contents. In some cases, for each tile with a portion of the hole in it, the image editor 112 can find the highest value in the source map associated with that tile. The image editor 112 can then find a corresponding tile of the original image and load that corresponding tile into the memory buffer. In some implementations, the image editor 112 need not deallocate and reallocate the memory buffer in the memory 118 to do so. Instead, the image editor 112 can replace the copy image with the tile of the original image. As such, the tile size may be dependent on the size of the copy image. That is, the tile size may be equal to or less than the size of the copy image. Further, the size of tiles containing holes need not correspond to the size of the tiles containing the contents.

Once loaded, the image editor can use a patch-based hole filling algorithm, such as previously described or any other appropriate algorithm, to identify content in die image tile in the memory buffer and fill any portions of the hole that am in that patch.

Figure 3A:
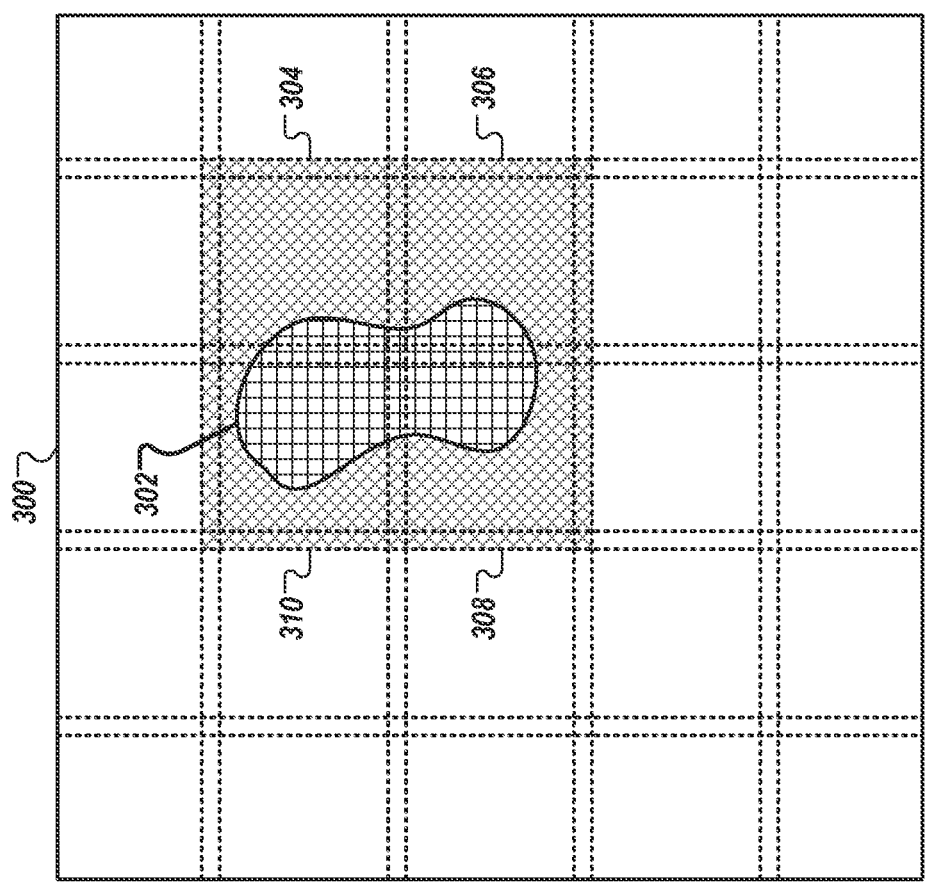
FIG. 3A schematically shows an example of an image with a hole to be filled.

FIG. 3A schematically shows an example of an image 300 with a hole to be filled. The image 300, of which only a subsection is shown for clarity, is a raster image made of pixels (not shown) aligned in a two dimensional array or grid. The pixels may represent color according to any appropriate color space scheme, such as any of Red, Green, Blue (RGB), or Cyan, Magenta, Yellow, and Black (CMYK) to name a few examples. The following describes an example of a raster image of pixels; however, other formats may be used.

The image is split into multiple tiles of a common size, based on the size of the memory buffer. Here, each tile is a square shape, but other shapes are possible. For example, each tile may be a rectangle with a height to width ratio that is the same as that of the image 300. Each patch overlaps surrounding patches by, in this example, 10% of the patch size. Greater or smaller amounts of overlap can be used.

The image 300 contains a hole 302. The representation of the hole 302 on disk or in memory can be based, on the format of the image 300. For example, the hole may be represented as an 8-bit alpha mask. Pixels with a 0 value can represent the interior of the hole, and a 255 value can represent the exterior of the hole. Pixels with a value between 0 and 255 may also be used as a soft mask. Alternatively, the hole 302 may be a section identified for modification. For example, the hole 302 can occur because the user of the image editor 112 applies a selection tool (e.g., a lasso, rectangle, or soft selection tool), thereby identifying the hole 302, and commands the image editor 112 to modify the selected area. In this case, the content of the hole need not necessarily be deleted or removed.

Figure 3B:
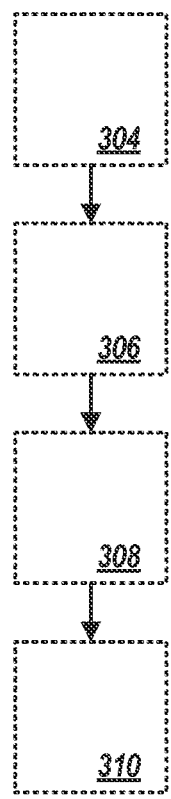
FIG. 3B schematically shows an example of tiles of the image arranged by the order in which they may be filled.

Here, each of four tiles 304-310 in the image 300 contains one or more portions of the hole 302. If the process 200 is run on the image 300, these four tiles would correspond to the tiles in 212-220. In some implementations, the tiles can be filled in concentric order, from the outside of the hole toward the center. One way of determining this order is to find, for every tile 304-310, the pixel in the tile that is inside the bole 302 and farthest away from the border of the hole 302. The tiles can then be sorted in ascending order of the distance between that pixel and the border. In this example, that order is shown as tile 304, tile 306, tile 308, then tile 310, as schematically illustrated in FIG. 3B.

Although the tiles 304-310 are shown in an order where every sequential pair of tiles 304-310 are adjacent in the image 300, other examples may a sequence of tiles in which some tiles are not adjacent to a tile before or after. Additionally or alternatively, other example images may include tiles that are completely within a hole. In these cases, these tiles can be ordered by the same metric as the tiles 304-310.

In some implementations, the contents of at least one of the tiles 304-310 can be used as a constraint on the content selected to bit the hole 302. For example, the original image content (shown here with diagonal cross-hatching) can be treated as a hard constraint on content selected to fill the hole. Similarly, the portions of the hole that have already been filled (shown here with vertical and horizontal cross-hatching) can be treated as a soft constraint. For example, one or more constraints can be taken into account in the patch-matching process and thereby affect what other patch(es) may be considered a source for a constrained patch. In the example of an 8-bit alpha mask, bard constraints can be enforced by use of an "over" or "alpha blend" between, die computed pixel value and the input pixel value, using the value of the hole mask as the alpha according to the formula o=c*(1−alpha/255)+i*alpha/255, where o is the output color, c is the input constraint pixel value and i is the computed value. This constraint is re-applied after every iteration of the patch-based optimization, so that the modified pixel values are considered in subsequent patch searches.

In some implementations, filling the hole 302 in a patch-wise process, such as the process 200, can generate visual artifacts along die border of the patches. In these and other situations, artifacts can be reduced or eliminated by providing overlap between patches. For example, the overlapping, sections of the patches can be merged, such as by feathering the overlapping sections together.

Figure 4:
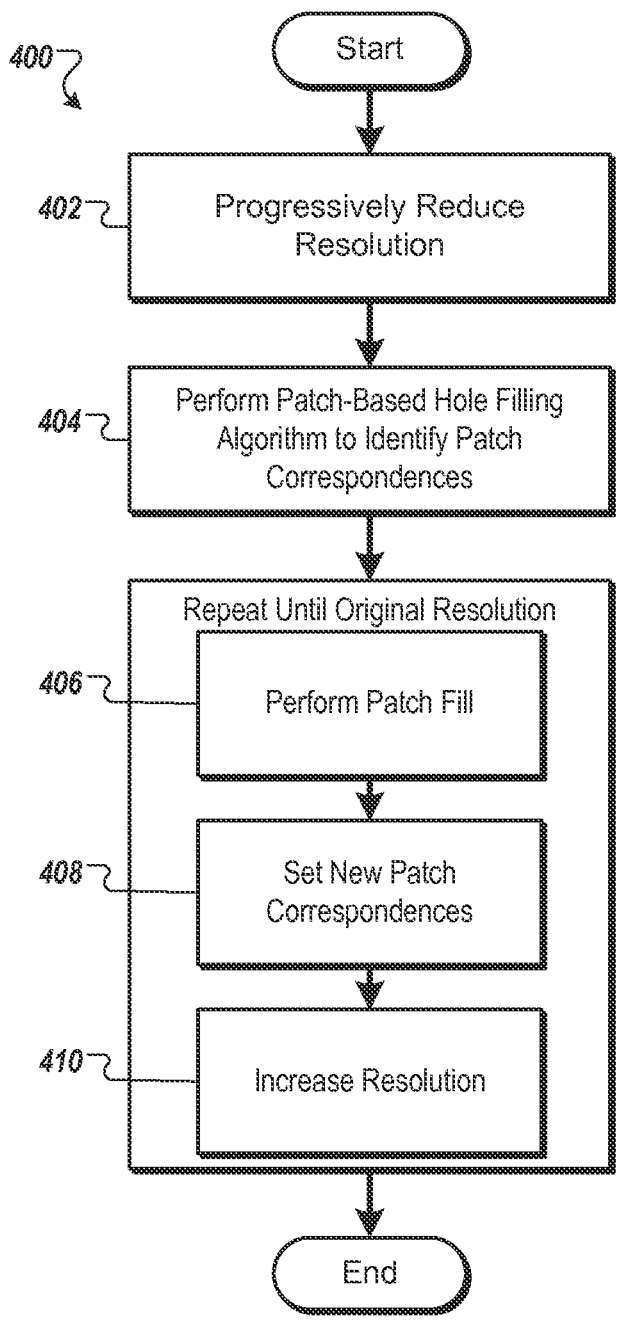
FIG. 4 shows a flowchart of another example process of filling a hole in an image.

FIG. 4 shows a flowchart of another example process 400 of filling a hole in an image. In some implementations, the process 400 can be performed by a system such as the system 100 (FIG. 1). As such, an example of the process 400 will here be described as being performed by the system 100. However, other systems, or groups of systems, can perform the process 400. For example, the process 400 can be split across a client and server.

The process 400 is similar to the process 200 in some regards. However, the process 400 involves multiple iterations on successively finer resolution copies of the original image, instead of using one single low-resolution iteration. The process 400, in some implementations, may produce better results than the process 200 and/or may require less memory than the process 400. However, the process 400, in some implementations, may also require more processing time. As such, the process 400 may be desirable in situations in which memory and/or quality is at a premium, but time is not. One such situation may be in a mobile computing device (e.g., tablet or smart phone) with limited memory. Another such situation may be when the modified image is to be viewed at a very high resolution, such as for print or for High Definition (HD) video. The process 200, on the other hand, may be desirable in situations in which confuting time is at a premium. One such situation may be in a desktop or server computing system that processes many image modifications at a time.

In the process 400, an image's resolution is progressively reduced (402). For example, a user of the image editor 112 can, through the input device 110, edit an image to delete a section of the image and indicate that the image editor 112 should fill the hole with content from the image. To find this content, the image editor 112 can allocate a memory buffer in the memory 118 and attempt to load the image into the memory.

The image editor 112 can create a copy of the image and reduce the size of the copy image to fit within the memory buffer. In some implementations, the image editor 112 can progressively reduce the resolution of the copy by some reduction ratio until the copy image is successfully loaded into the memory buffer. Possible values For the redaction ratio include, but are not limited to, 95:100, 9:10, 7:8, and 1:2.

In some implementations, loading the copy image into the memory buffer can allow the image editor 112 to access any portion of the copy image, albeit at a lower resolution. As such, the image editor 112 can, for example, search for content in any part of the copy image without loading and unloading portions of the image from memory 118.

A patch-based hole filling algorithm is performed to identify patch correspondences (404). For example, the image editor 112 can fill the hole of the copy image with a nearest-neighbor patch-based optimization algorithm, or any other type of content aware fill, using the copy linage.

While processing the patch-based hole filling algorithm, the image editor 112 can build a source map for each patch of the hole and the nearest neighbor field. The source map holds a record of the number of times patches of the copy image are identified by the nearest-neighbor algorithm.

Until the hole is filled at the original resolution, a patch fill is performed (406), the tile fill source location information is set as the patch correspondences (408), and the resolution is increased (410). For example, the image editor 112 can perform actions corresponding to those described in 214-218 (FIG. 2) to fill the hole at the current resolution. Once filled, the image editor 112 can generate a new source map for the fill at this resolution and increase the resolution of the image. If the newly increased resolution is less than the resolution of the original image, 406-410 cart be repeated until the original resolution is reached. Before repeating 406-410, the intermediate results (e.g., color pixel buffers and nearest neighbor fields) can be flushed to a disk cache. The source maps for the next finer resolution's tiles can then be summed over all overlapping tiles at the coarser resolution and stored at a still coarser resolution.

As discussed in this document, an electronic image (which, for brevity is simply referred to as an image) may, but need not, correspond to a file. An image may be stored in a portion of a file that holds other images, in a single file dedicated to the image question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution, by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines tor processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known, as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated flies (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind, of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on & computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide tor interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include cheats and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, those should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described. In the context of a single embodiment can also be implemented in multiple embodiments separately or in any suitable subcombination. Moreover, although features may be described above as acting in certain combinations and even initially claimed as such, one or more features from a claimed combination can in some eases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring snob separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some configurations, non-contiguous tiles of a hole may be filled in parallel by parallel processors in (214-218) of the process 200. For example a hole may have nine tiles in a three by three grid. For this example, the tiles will be referred to by their row and column in the grid, from [1,1] to [3,3]. If four processors are available, the non-contiguous tiles [1,1], [3,1], [1,3] and [3,3] may be filled in parallel. Once those tiles are finished, the tiles [2,1] and [2,3] may be filled in parallel, followed by [1,2] and [3,2], and lastly [2,2]

What is claimed is:

1. A method performed by data processing apparatus, the method comprising:
   accessing a second image corresponding to a lower resolution of a first image, the second image comprising a second hole corresponding to a first hole of the first image;
   identifying, in the second image, one or more second-image source patches for the second hole;
   identifying at least one first-image source patch in the first image based on a location of the identified second-image source patch;
   identifying fill content in the at least one first-image source patch; and
   placing the identified fill content in the first hole.

2. The method of claim 1, wherein the identified at least one first-image source patch is stored in memory, wherein the first hole comprises a plurality of tiles, and wherein i) the identification of the at least one first-image source patch in the first image; ii) the storing of the identified at least one first-image source patch; and iii) the placement of the identified fill content are performed for each first-hole tile.

3. The method of claim 2, wherein one or more portions of some of the first-hole tiles overlap with one or more portions of other first-hole tiles, the method further comprising:
   feathering at least one of the portions of first-hole tiles that overlap.

4. The method of claim 1, the method further comprising:
   determining that the first image cannot be stored in memory; and
   creating the second image by progressively reducing the resolution of the first image until the second image can be stored in memory.

5. The method of claim 1, wherein identifying the first-image source patch comprises:
   generating a map of the first-image source patches, the map indicating a count of the times each source patch is identified;
   generating, for each entry in the map of the first-image of source patches, a summation value that aggregates that entry and neighboring entries; and
   identifying a highest summation value.

6. The method of claim 5, wherein generating the summation value comprises convolving the map of the first-image source patches.

7. The method of claim 1, wherein the fill content is identified using image content bordering that part of the first hole as a constraint.

8. A non-transitory computer storage medium encoded with a computer program, the program comprising instructions that when executed by data processing apparatus cause the data processing apparatus to perform operations comprising:
   generating, based on a first image having a first hole, a second image corresponding to a lower resolution of the first image, the second image having a second hole corresponding to the first hole;
   identifying, in the second image, one or more second-image source patches for the second hole;
   identifying at least one first-image source patch in the first image based on a location of the identified second-image source patch;
   identifying fill content in the at least one first-image source patch; and
   placing the identified fill content in the first hole.

9. The medium of claim 8, wherein the identified at least one first-image source patch is stored in memory, wherein the first hole comprises a plurality of tiles, and wherein i) identifying at least one first-image source patch in the first image based on a location of the identified second-image source patch; ii) storing the identified at least one first-image source patch in memory; and iii) placing the identified fill content in the first hole is repeated for each first-hole tiles.

10. The medium of claim 9, wherein some portions of some of the first-hole tiles overlap with some portions of other first-hole tiles, the method further comprising:
    feathering the portions of first-hole tiles that overlap.

11. The medium of claim 9, the operations further comprising:
    determining that the first image cannot be stored in memory; and
    creating the second image by progressively reducing the resolution of the first image until the second image can be stored in memory.

12. The medium of claim 9, wherein identifying the first-image source patch comprises:
    generating a map of the first-image source patches, the map indicating a count of the times each source patch is identified;
    generating, for each entry in the map of the first-image of source patches, a summation value that aggregates that entry and neighboring entries; and
    identifying a highest summation value.

13. The medium of claim 12, wherein generating the summation value comprises convolving the map of the first-image source patches.

14. The medium of claim 9, wherein the fill content is identified using image content bordering the first hole as a constraint.

15. A system comprising:
a processor;
a memory communicatively coupled to the processor and bearing instructions that, upon execution by the processor, cause the system to at least:
generate a second image corresponding to a lower resolution of a first image having a first hole, the second image having a second hole corresponding to the first hole;
identify, in the second image, one or more second-image source patches for the second hole;
identify at least one first-image source patch in the first image based on a location of the identified second-image source patch;
identify fill content in the at least one first-image source patch; and
place the identified fill content in the first hole.

16. The system of claim 15, wherein the one or more computers comprise a server operable to interact with the device through a data communication network, and the device is operable to interact with the server as a client.

17. The system of claim 16, wherein the device comprises a personal computer running a web browser, a mobile telephone running a web browser, a tablet computer running a web browser.

18. The system of claim 15, wherein the one or more computers consist of one computer, the device is a user interface device, and the one computer comprises the user interface device.

19. The system of claim 15, wherein generating the second image at a lower resolution that the first image comprises:
determining that the first image cannot be stored in memory; and
creating the second image by progressively reducing the resolution of the first image until the second image can be stored in memory, and
wherein identifying at least one first-image source patch in the first image comprises:
storing the at least one first-image source patch in memory; and
using the at least at least one first-image source patch stored in memory to place the identified fill content in the first hole.

20. The system of claim 15, wherein the identified at least one first-image source patch is stored in a memory buffer, wherein the first hole comprises a plurality of tiles, and wherein the plurality of tiles are sized as a function of a size of the memory buffer.

\* \* \* \* \*